(12) United States Patent
Rao

(10) Patent No.: US 8,111,253 B2
(45) Date of Patent: Feb. 7, 2012

(54) CONTROLLING USAGE CAPACITY IN A RADIO ACCESS NETWORK

(75) Inventor: Prashanth Rao, Lowell, MA (US)

(73) Assignee: Airvana Network Solutions, Inc., Chelmsford, MA (US)

( * ) Notice: Subject to any disclaimer, the term of this patent is extended or adjusted under 35 U.S.C. 154(b) by 353 days.

(21) Appl. No.: 11/191,528

(22) Filed: Jul. 28, 2005

(65) Prior Publication Data

US 2007/0026884 A1    Feb. 1, 2007

(51) Int. Cl.
*G09G 5/00* (2006.01)

(52) U.S. Cl. ........ 345/419; 345/156; 345/169; 345/173; 345/420; 345/426; 455/453; 455/522; 455/439; 455/442; 455/67.11; 370/329; 370/330; 370/338; 370/464

(58) Field of Classification Search .................. 455/453, 455/522, 442, 439, 67.11; 370/329–338, 370/464; 345/156, 169–173, 419–427
See application file for complete search history.

(56) References Cited

U.S. PATENT DOCUMENTS

| | | | |
|---|---|---|---|
| 4,031,469 A | 6/1977 | Johnson | |
| 4,072,900 A | 2/1978 | Ray | |
| 5,631,604 A | 5/1997 | Dent et al. | |
| 5,828,677 A | 10/1998 | Sayeed et al. | |
| 5,842,140 A | 11/1998 | Dent et al. | |
| 5,857,147 A | 1/1999 | Gardner et al. | |
| 5,873,028 A | 2/1999 | Nakano et al. | |
| 5,878,350 A | 3/1999 | Nakamura et al. | |
| 5,884,187 A | 3/1999 | Ziv et al. | |
| 5,923,650 A | 7/1999 | Chen et al. | |
| 5,982,760 A | 11/1999 | Chen | |
| 6,085,108 A | 7/2000 | Knutsson et al. | |
| 6,226,525 B1* | 5/2001 | Boch et al. | 455/522 |
| 6,259,927 B1 | 7/2001 | Butovitsch et al. | |
| 6,507,744 B1 | 1/2003 | Han et al. | |
| 6,567,420 B1 | 5/2003 | Tiedemann, Jr. et al. | |
| 6,584,087 B1 | 6/2003 | Czaja et al. | |
| 6,633,552 B1 | 10/2003 | Ling et al. | |
| 6,697,378 B1* | 2/2004 | Patel | 370/468 |
| 6,711,144 B1 | 3/2004 | Kim et al. | |
| 6,731,618 B1 | 5/2004 | Chung et al. | |
| 6,741,862 B2 | 5/2004 | Chung et al. | |
| 6,775,548 B1 | 8/2004 | Rong et al. | |
| 6,781,999 B2 | 8/2004 | Eyuboglu et al. | |
| 6,823,193 B1 | 11/2004 | Persson et al. | |
| 6,904,286 B1 | 6/2005 | Dantu | |
| 6,965,564 B2 | 11/2005 | Coffman | |
| 6,983,153 B2 | 1/2006 | Jain et al. | |
| 6,983,333 B2 | 1/2006 | Haberland | |
| 6,999,425 B2* | 2/2006 | Cheng et al. | 370/252 |
| 7,016,686 B2* | 3/2006 | Spaling et al. | 455/453 |
| 7,031,141 B2* | 4/2006 | Kuriyama | 361/528 |

(Continued)

OTHER PUBLICATIONS

U.S. Appl. No. 10/835,546, filed Apr. 28, 2004, and pending claims.

(Continued)

*Primary Examiner* — Jin-Cheng Wang
(74) *Attorney, Agent, or Firm* — Fish & Richardson P.C.

(57) ABSTRACT

In a radio access network, techniques for controlling relative usages, by different groups of access terminals in communication with a radio access network, of available power handling capacity of the radio access network, based on information about usages by different groups of access terminals in communication with the radio access network.

42 Claims, 5 Drawing Sheets

U.S. PATENT DOCUMENTS

| | | | |
|---|---|---|---|
| 7,082,317 | B2 | 7/2006 | Yano et al. |
| 7,085,570 | B2 * | 8/2006 | Tigerstedt et al. ............ 455/439 |
| 7,120,134 | B2 | 10/2006 | Tiedemann et al. |
| 7,120,447 | B1 * | 10/2006 | Chheda et al. ................ 455/453 |
| 7,136,353 | B2 | 11/2006 | Ha et al. |
| 7,136,666 | B2 * | 11/2006 | Charriere et al. ............ 455/522 |
| 7,142,548 | B2 | 11/2006 | Fong et al. |
| 7,170,871 | B2 | 1/2007 | Eyuboglu et al. |
| 7,194,010 | B2 | 3/2007 | Beasley et al. |
| 7,200,391 | B2 * | 4/2007 | Chung et al. ................. 455/423 |
| 7,206,291 | B2 | 4/2007 | Soldani et al. |
| 7,242,958 | B2 | 7/2007 | Chung et al. |
| 7,248,875 | B2 * | 7/2007 | Schreuder et al. ............ 455/442 |
| 7,248,889 | B2 | 7/2007 | Schwarz et al. |
| 7,268,674 | B2 | 9/2007 | Bohler et al. |
| 7,277,446 | B1 | 10/2007 | Abi-Nassif et al. |
| 7,299,278 | B2 | 11/2007 | Ch'ng |
| 7,305,241 | B2 * | 12/2007 | Hirvonen et al. ............ 455/453 |
| 7,366,230 | B2 | 4/2008 | Jonsson |
| 7,466,669 | B2 | 12/2008 | Hosein |
| 7,574,230 | B1 | 8/2009 | Oh et al. |
| 7,689,173 | B2 | 3/2010 | Ihm et al. |
| 7,729,243 | B2 | 6/2010 | Ananthaiyer et al. |
| 7,831,257 | B2 | 11/2010 | Pollman et al. |
| 7,843,892 | B2 | 11/2010 | Mehrabanzad et al. |
| 7,983,708 | B2 | 7/2011 | Mehrabanzad et al. |
| 2001/0040880 | A1 | 11/2001 | Chen et al. |
| 2002/0021687 | A1 | 2/2002 | Toki et al. |
| 2002/0072385 | A1 | 6/2002 | Salvarani et al. |
| 2002/0111183 | A1 | 8/2002 | Lundby |
| 2002/0186657 | A1 * | 12/2002 | Jain et al. ...................... 370/235 |
| 2002/0191567 | A1 | 12/2002 | Famolari et al. |
| 2002/0193118 | A1 * | 12/2002 | Jain et al. ...................... 455/453 |
| 2002/0196749 | A1 | 12/2002 | Eyuboglu et al. |
| 2003/0002507 | A1 | 1/2003 | Hans et al. |
| 2003/0072294 | A1 | 4/2003 | Wei et al. |
| 2003/0083092 | A1 | 5/2003 | Kim et al. |
| 2003/0092463 | A1 | 5/2003 | Charriere et al. |
| 2003/0100311 | A1 | 5/2003 | Chung et al. |
| 2004/0038697 | A1 | 2/2004 | Attar et al. |
| 2004/0047305 | A1 | 3/2004 | Ulupinar |
| 2004/0109424 | A1 * | 6/2004 | Chheda ......................... 370/331 |
| 2004/0110534 | A1 | 6/2004 | Chung et al. |
| 2004/0158790 | A1 * | 8/2004 | Gaal et al. ..................... 714/748 |
| 2004/0179494 | A1 | 9/2004 | Attar et al. |
| 2004/0179525 | A1 | 9/2004 | Balasubramanian et al. |
| 2004/0185868 | A1 * | 9/2004 | Jain et al. ...................... 455/453 |
| 2004/0202136 | A1 * | 10/2004 | Attar et al. .................... 370/333 |
| 2004/0213182 | A1 * | 10/2004 | Huh et al. ..................... 370/332 |
| 2004/0228286 | A1 * | 11/2004 | Kim et al. ..................... 370/252 |
| 2004/0229604 | A1 | 11/2004 | Fong et al. |
| 2005/0047365 | A1 * | 3/2005 | Hong et al. ................... 370/328 |
| 2005/0047375 | A1 | 3/2005 | Kwon et al. |
| 2005/0107090 | A1 | 5/2005 | Hosein |
| 2005/0107091 | A1 | 5/2005 | Vannithamby et al. |
| 2005/0124369 | A1 | 6/2005 | Attar et al. |
| 2005/0141454 | A1 * | 6/2005 | Jain et al. ...................... 370/331 |
| 2005/0169301 | A1 * | 8/2005 | Jain et al. ...................... 370/464 |
| 2005/0192042 | A1 * | 9/2005 | Au et al. ........................ 455/522 |
| 2005/0213555 | A1 | 9/2005 | Eyuboglu et al. |
| 2005/0243749 | A1 | 11/2005 | Mehrabanzad et al. |
| 2005/0245279 | A1 | 11/2005 | Mehrabanzad et al. |
| 2005/0250511 | A1 | 11/2005 | Xiao et al. |
| 2006/0067422 | A1 | 3/2006 | Chung |
| 2006/0067451 | A1 | 3/2006 | Pollman et al. |
| 2006/0126509 | A1 | 6/2006 | Abi-Nassif |
| 2006/0135173 | A1 | 6/2006 | Vannithamby |
| 2006/0135189 | A1 | 6/2006 | Nagaraj et al. |
| 2006/0159045 | A1 * | 7/2006 | Ananthaiyer et al. ........ 370/329 |
| 2006/0176187 | A1 | 8/2006 | Bohler et al. |
| 2006/0215608 | A1 | 9/2006 | Lee et al. |
| 2006/0240782 | A1 * | 10/2006 | Pollman et al. ............ 455/67.11 |
| 2006/0252429 | A1 * | 11/2006 | Chen et al. .................... 455/450 |
| 2006/0268798 | A1 * | 11/2006 | Kim et al. ..................... 370/338 |
| 2006/0291420 | A1 | 12/2006 | Ng |
| 2006/0294241 | A1 | 12/2006 | Cherian et al. |
| 2007/0026884 | A1 | 2/2007 | Rao |
| 2007/0058628 | A1 | 3/2007 | Rao et al. |
| 2007/0077948 | A1 | 4/2007 | Sharma et al. |
| 2007/0081509 | A1 * | 4/2007 | Ihm et al. ...................... 370/342 |
| 2007/0097916 | A1 | 5/2007 | Eyuboglu et al. |
| 2007/0101015 | A1 | 5/2007 | Larsson et al. |
| 2007/0115896 | A1 | 5/2007 | To et al. |
| 2007/0140172 | A1 | 6/2007 | Garg et al. |
| 2007/0140184 | A1 | 6/2007 | Garg et al. |
| 2007/0140185 | A1 | 6/2007 | Garg et al. |
| 2007/0140218 | A1 | 6/2007 | Nair et al. |
| 2007/0155329 | A1 | 7/2007 | Mehrabanzad et al. |
| 2007/0202826 | A1 | 8/2007 | Dean |
| 2007/0220573 | A1 | 9/2007 | Chiussi et al. |
| 2007/0230419 | A1 | 10/2007 | Raman et al. |
| 2007/0238442 | A1 | 10/2007 | Mate et al. |
| 2007/0238476 | A1 | 10/2007 | Raman et al. |
| 2007/0242648 | A1 | 10/2007 | Garg et al. |
| 2007/0248035 | A1 | 10/2007 | Sang et al. |
| 2007/0248042 | A1 | 10/2007 | Harikumar et al. |
| 2008/0003988 | A1 | 1/2008 | Richardson |
| 2008/0013488 | A1 | 1/2008 | Garg et al. |
| 2008/0062925 | A1 | 3/2008 | Mate et al. |
| 2008/0065752 | A1 | 3/2008 | Ch'ng et al. |
| 2008/0069020 | A1 | 3/2008 | Richardson |
| 2008/0069028 | A1 | 3/2008 | Richardson |
| 2008/0076398 | A1 | 3/2008 | Mate et al. |
| 2008/0117842 | A1 | 5/2008 | Rao |
| 2008/0119172 | A1 | 5/2008 | Rao et al. |
| 2008/0120417 | A1 | 5/2008 | Harikumar et al. |
| 2008/0139203 | A1 | 6/2008 | Ng et al. |
| 2008/0146154 | A1 | 6/2008 | Claussen et al. |
| 2008/0146232 | A1 | 6/2008 | Knisely |
| 2008/0151843 | A1 | 6/2008 | Valmikam et al. |
| 2008/0159236 | A1 | 7/2008 | Ch'ng et al. |
| 2008/0162924 | A1 | 7/2008 | Chinitz et al. |
| 2008/0162926 | A1 | 7/2008 | Xiong et al. |
| 2009/0088146 | A1 * | 4/2009 | Wigren et al. ................ 455/423 |
| 2009/0124250 | A1 | 5/2009 | Topaltzas et al. |
| 2009/0170547 | A1 | 7/2009 | Raghothaman et al. |
| 2010/0177731 | A1 | 7/2010 | Ananthaiyer et al. |
| 2010/0254338 | A1 | 10/2010 | Tanaka |

OTHER PUBLICATIONS

U.S. Appl. No. 10/835,537, filed Apr. 28, 2004, and pending claims.
U.S. Appl. No. 11/037,515, filed Jan. 18, 2005, and pending claims.
U.S. Appl. No. 11/114,422, filed Apr. 26, 2005, and pending claims.
U.S. Appl. No. 11/965,070, filed Dec. 27, 2007, and pending claims.
3rd Generation Partnership Project "3GPP2", CDMA 2000 High Rate Packet Data Air Interface Specification, C.S0024-A, version 4.0, Oct. 25, 2002.
3rd Generation Partnership Project "3GPP2", CDMA 2000 High Rate Packet Data Air Interface Specification, C.S0024-A, version 1.0, Mar. 2004.
3rd Generation Partnership Project "3GPP2", CDMA2000 High Rate Packet Data Interface Specification, TIA/EIA/IS-856A, C.S0024-A, Version 2, Jul. 2005 (1227 pages).
3rd Generation Partnership Project "3GPP2", CDMA2000 High Rate Packet Data Interface Specification, TIA/EIA/IS-856B, C.S0024-B, Version 1, Apr. 2006 (1623 pages).
3rd Generation Partnership Project "3GPP2", CDMA2000 High Rate Packet Data Interface Specification, TIA/EIA/IS-856B, C.S0024-B, Version 2, Mar. 2007 (1627 pages).
Base Transceiver Station that Connects Mobile Phones to the Public Network, System Applications; Backbone Communications; Base Transceiver Stations (Mobile Telephony), NEC Electronics, Jun. 3, 2005, pp. 1-4, http://necel.com/en/solutions/applications/bs/bs.html.
Charkravarth, S., "Algorithm for Reverse Traffic Rate Control for cdma2000 High Rate Packet Data Systems", GLOBECOM2001, San Antonino, Texas, Nov. 2001 (pp. 3733-3737).
3rd Generation Partnership Project "3GPP2", "TSG-C WG3, 1xEV-DO, Evaluation Methodology", 3GPP2 TSG-C Contribution C30-20031002-004, Oct. 2004 (194 pages).
Attar, Rashid A. and Eduardo Esteves, "A Reverse Link Outer-Loop Power Control Algorithm for CDMA2000 1xEV Systems", Proceedings of ICC, Apr. 2002.
Garg, Vijay K., "IS-95 CDMA and cdma 2000 Cellular/PCS Systems Implementation", Communication Engineering and emerging Technologies, Series Editor, Theodore S. Rappaport, Chapter 10, Prentice Hall, 1999.
Steele, Raymond and Lajos Hanzo, "Mobile Radio Communications", Second Edition, Second Edition, Second and Third Generation Cellular and WATM Systems, Pentech Press Limited, London, England, 1992.
Office Action and response history as of Feb. 23, 2009 in U.S. Appl. No. 10/835,546.
Office Action and response history as of Feb. 12, 2009 in U.S. Appl. No. 10/835,537.
Office Action and response history as of Feb. 23, 2009 in U.S. Appl. No. 11/037,515.
Office Action and response history as of Feb. 12, 2009 in U.S. Appl. No. 11/114,422.
Office Action and response history as of Aug. 9, 2009 in U.S. Appl. No. 11/114,422.
Office Action and response history as of Jan. 6, 2010 in U.S. Appl. No. 11/037,515.
Office Action and response history as of Dec. 23, 2009 in U.S. Appl. No. 10/835,546.
Office Action and response history as of Jan. 13, 2010 in U.S. Appl. No. 10/835,537.
Office Action and response history as of Apr. 8, 2009 in U.S. Appl. No. 10/835,537.
Office Action and response history as of Apr. 29, 2009 in U.S. Appl. No. 11/114,422.
Office action from U.S. Appl. No. 11/037,515 mailed Jun. 15, 2009.
Advisory action mailed Jul. 16, 2009 and request for continued examination filed Jul. 21, 2009 from U.S. Appl. No. 11/114,422.
Advisory action mailed Jun. 2, 2009 and request for continued examination filed Jul. 21, 2009 from U.S. Appl. No. 10/835,546.
U.S. Appl. No. 12/731,841, filed Mar. 25, 2010, and pending claims.
Office Action and response history as of Mar. 4, 2010 in U.S. Appl. No. 11/114,422.
Office Action and response history as of Mar. 25, 2010 in U.S. Appl. No. 10/835,546.
Fish & Richardson P.C., Amendment in Reply to Action dated Mar. 18, 2010 in U.S. Appl. No. 10/835,537, filed Jul. 19, 2010, 15 pages.
Office Action and response history as of Sep. 24, 2009 in U.S. Appl. No. 11/037,515.
Office Action and response history as of Sep. 24, 2009 in U.S. Appl. No. 10/835,546.
Office Action and response history as of Oct. 14, 2009 in U.S. Appl. No. 10/835,537.
Office Action and response history as of Dec. 9, 2009 in U.S. Appl. No. 11/114,422.
USPTO Non-Final Office Action in U.S. Appl. No. 12/731,841, dated Aug. 4, 2010, 12 pages.
USPTO Non-Final Office Action in U.S. Appl. No. 10/835,546, dated Dec. 7, 2010, 28 pages.
U.S. Appl. No. 12/955,610, filed Nov. 29, 2010, and pending claims.
Fish & Richardson P.C., Response to Action dated Aug. 4, 2010 in U.S. Appl. No. 12/731,841, filed Jan. 4, 2011, 9 pages.
Fish & Richardson P.C., Appeal Brief in Reply to Action dated Mar. 25, 2010 in U.S. Appl. No. 10/835,546, filed Jul. 26, 2010, 5 pages.
USPTO Notice of Allowance in U.S. Appl. No. 10/835,537, dated Oct. 1, 2010, 11 pages.
Non Final Office Action in U.S. Appl. No. 12/955,610, dated Jul. 1, 2011, 16 pages.
USPTO Non-Final Office Action in U.S. Appl. No. 11/965,070, dated Aug. 5, 2011, 19 pages.
Fish & Richardson P.C., Response to Action dated Dec. 7, 2010 in U.S. Appl. No. 10/835,546, filed Mar. 7, 2011, 17 pages.
USPTO Final Office Action in U.S. Appl. No. 12/731,841, dated Mar. 21, 2011, 13 pages.
USPTO Notice of Allowance in U.S. Appl. No. 10/835,546, dated May 26, 2011, 15 pages.

* cited by examiner

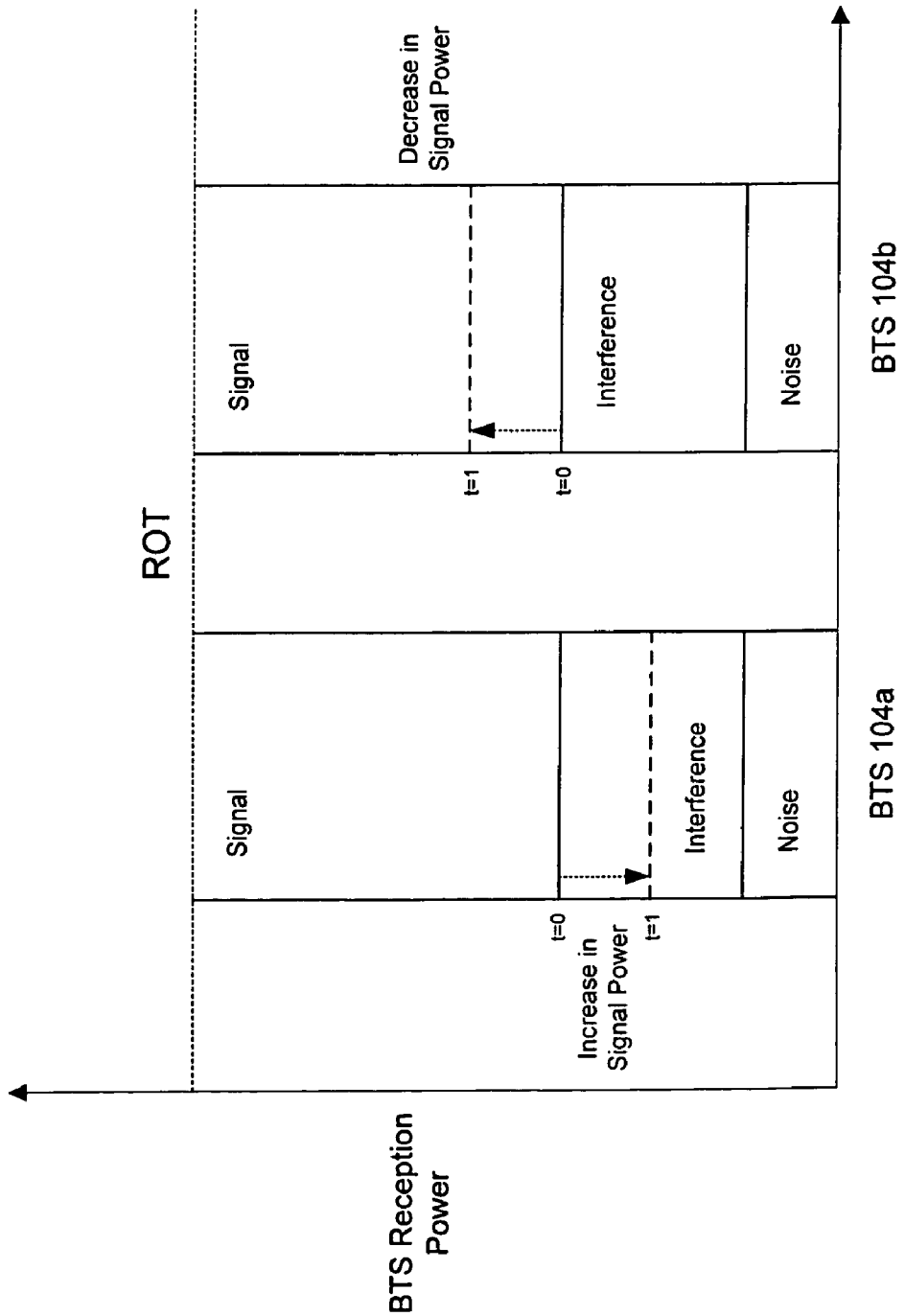

CONTROLLING USAGE CAPACITY IN A RADIO ACCESS NETWORK

TECHNICAL FIELD

This disclosure relates to controlling usage capacity in a radio access network.

BACKGROUND

Cellular wireless communications systems are designed to serve many access terminals distributed in a large geographic area by dividing the area into cells. At the center of each cell, a base transceiver station is located to serve access terminals (e.g., cellular telephones, laptops, PDAs) located in the cell. Each cell is often further divided into sectors by using multiple sectorized antennas (the term "sector" is used both conventionally and in this document, however, even when there is only one sector per cell). In each cell, a base transceiver station serves one or more sectors and communicates with multiple access terminals in its cell. A base transceiver station can generally support a certain amount of traffic in each sector for a particular bandwidth and it is often desirable to monitor the level of traffic in a sector in order to ensure that the sector is not becoming overloaded.

SUMMARY

In general, this disclosure relates to controlling usage capacity in a radio access network based on load information feedback so as to allocate limited radio resources amongst competing groups of access terminals with different performance requirements and priorities.

In one aspect, the invention features a method for controlling relative usages, by different groups of access terminals in communication with a radio access network, of available power handling capacity of the radio access network, based on information about usages by different groups of access terminals in communication with the radio access network.

Implementations of the invention may include one or more of the following. The method for controlling relative usages includes controlling levels of transmission power used by different groups of access terminals in communication with the radio access network, based on information about levels of transmission power associated with different groups of access terminals in communication with the radio access network. The method for controlling relative usages also includes controlling the level of transmission power used by one or more of the groups of access terminals to enable differentiated performance amongst groups of access terminals in communication with the radio access network. The performance can include temporal factors. Further, the performance can be measured by uplink data rate, uplink latency, or both. The method for controlling relative usages can be performed at a base station transceiver or a base station controller. The radio access network can include a code division multiple access network. For example, the radio access network can include a first evolution-data optimized or a first evolution-data/voice compliant network.

The method for controlling relative usages also includes at least one access terminal in communication with the radio access network. The method further includes information about usages by different groups of access terminals in communication with the radio access network such as relative levels of transmission power used by the groups of access terminals. The information can be exchanged between base transceiver stations in the radio access network. The information can also be sent from a base transceiver station to a base station controller for processing at the base station controller.

The method further includes determining a relative level of transmission power used by a group of access terminals. Such a determination can include comparing a decodable signal power received by a base transceiver station in the radio access network, transmitted by the group of access terminals, with a total power received by the base transceiver station in the radio access network. The determination can include determining a decodable signal power transmitted by the group of access terminals and received by a base transceiver station in the radio access network. The determination can also include determining a total power received by a base transceiver station in the radio access network.

Further, the method for controlling relative usages can include comparing an actual load associated with levels of transmission power used by a group of access terminals to a target load associated with the group of access terminals.

The method also includes controlling relative usages by setting transmission rate limits for different access terminals in communication with the radio access network. Setting a rate limit for an access terminal in the radio access network can include transmitting a rate limit to the access terminal. Transmitting the rate limit can involve broadcasting a rate limit message to the access terminal in one or more of the sectors in which the access terminal has a connection. Transmitting the rate limit can also involve unicasting a rate limit message to the access terminal in one or more of the sectors in which the access terminal has a connection.

In other aspects, corresponding computer programs and apparatus are also provided.

Advantages that can be seen in particular implementations of the invention include one or more of the following. Load assisted performance differentiation provides various levels of service, including premium performance for users demanding greater transmission throughput. Also, differentiated performance supports rate and latency sensitive services and multimedia applications such as high-quality audio, imaging, and real-time video. Further, differentiated performance based on load accounts for actual resource usage under varying transmission rates and traffic demands, whereas connection-count based loading fails to account for such conditions.

DESCRIPTION OF DRAWINGS

FIG. 3 is a diagram of a power adjustment between sectors.

DETAILED DESCRIPTION

Figure 1:
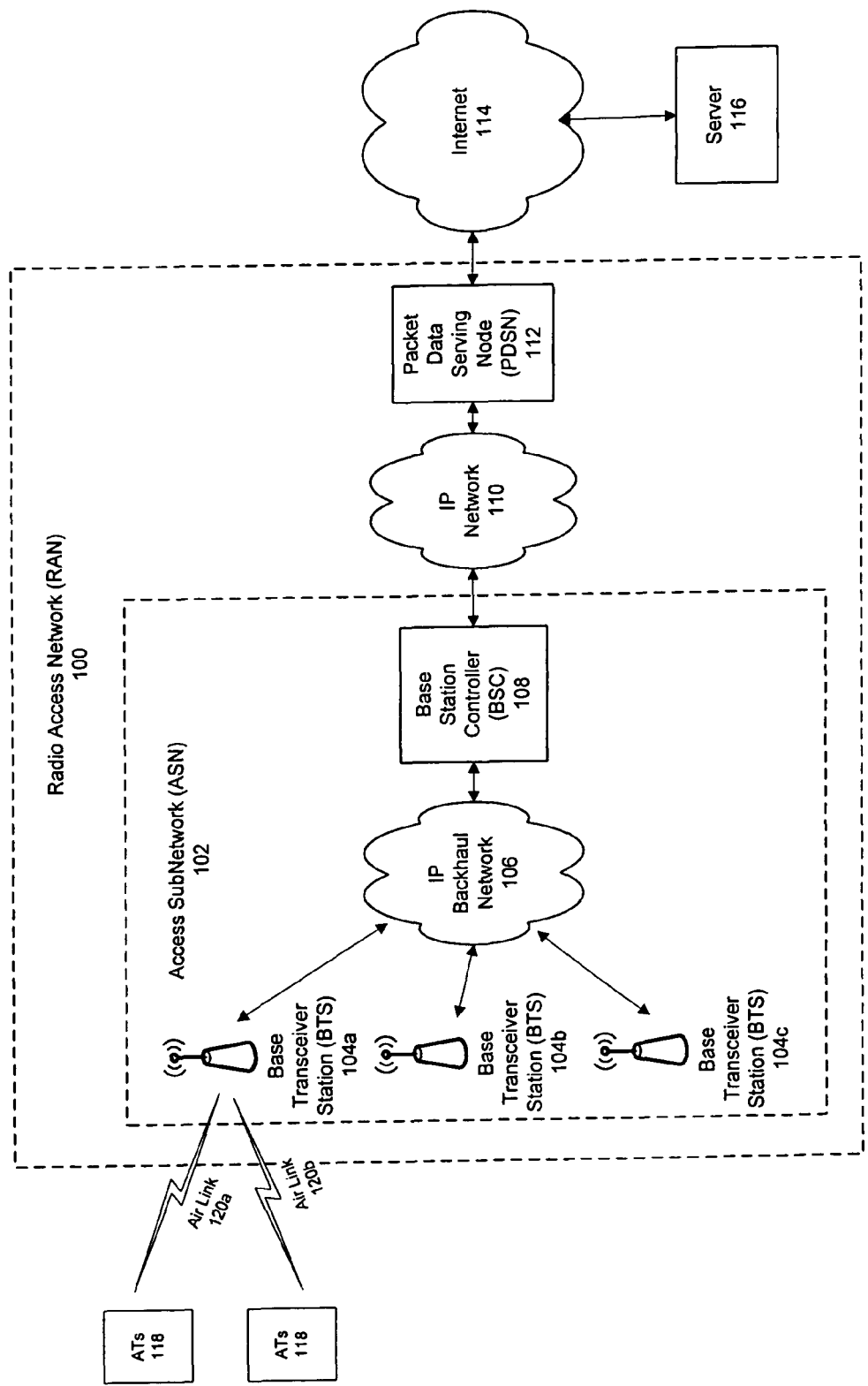
FIG. 1 is a diagram of a radio access network.

Referring to FIG. 1, a radio access network (RAN) 100 uses the first evolution data-only (1x EV-DO) protocol to transmit data packets between an access terminal 118, such as laptop or personal data assistant (PDA), and an external network such as the Internet 114. The 1xEV-DO protocol has been standardized by the Telecommunication Industry Association (TIA) as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856, "CDMA2000 High Rate Packet Data Air Interface Specification," 3GPP2 C.S0024-A, Version 1.0, March 2004, Ballot Resolution, but has yet not been adopted. Revision A is also incorporated herein by reference.

The radio access network 100, which may cover a large service area, includes one or more Access Sub-Networks (ASNs), e.g., ASN 102, each anchored by a Base Station Controller (BSC) 108 communicating with several Base Transceiver Stations (BTSs) 104a-104c using a private or public IP backhaul network 106. Each base transceiver station 104a-104c may support multiple sectors, with each sector covering a certain cell area around the base transceiver station 104a-104c.

An access sub-network 102 is connected over a public or private IP network 110 to one or more Packet Data Serving Nodes (PDSNs), e.g., PDSN 112. The packet data serving node 112, in turn, receives and transmits data packets (e.g., voice over IP packets) to a server 116 via the Internet 114. In some implementations, the functions of a packet data serving node 112 and a base station controller 108 are combined into a single device.

Each access terminal 118 is in communication with a base transceiver station, e.g., BTS 104a, via an air link 120a, 120b. An air link comprises a forward link, which carries data transmitted from a base transceiver station 104a-104c to an access terminal 118, and a reverse link, which carries data transmitted from an access terminal 118 to a base transceiver station 104a-104c. As an access terminal 118 moves from one sector to another sector serviced by different base transceiver stations 104a-104c, it undergoes a "soft handoff" between the base transceiver stations 104a-104c. Similarly, when an access terminal 118 moves from one sector to another sector serviced by the same base transceiver station 104a-104c, it undergoes a "softer handoff" between the sectors. When an access terminal 118 is in soft or softer handoff, it will have connections in multiple sectors.

Figure 2:
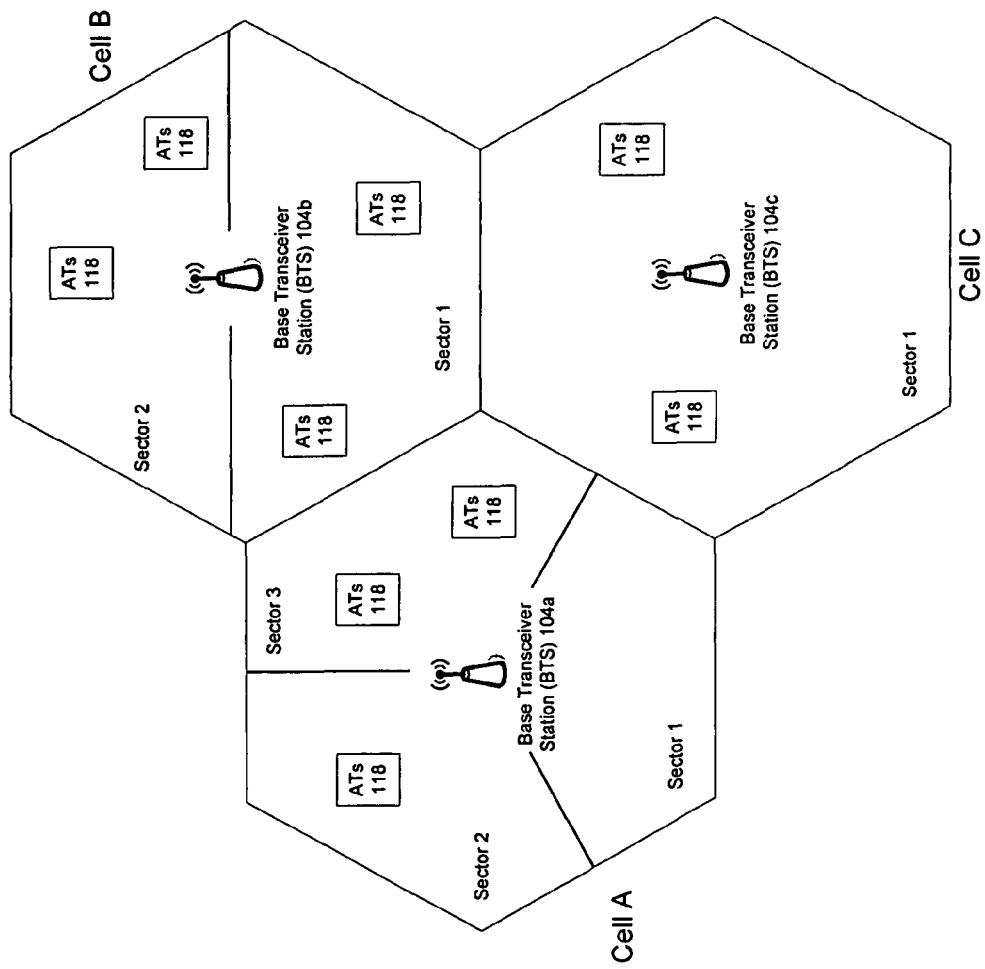
FIG. 2 is a diagram of cells in a radio access network.

As shown in FIG. 2, a geographic area covered by a radio access network 100 (shown in FIG. 1) is divided into multiple cells A, B, and C, which may be further structured as one or more sectors. Each cell includes a base transceiver station 104a-104c that communicates with access terminals (e.g., cellular telephones) 118 located within the cell. Each base transceiver station 104a-104c uses a directional antenna (not shown) appropriately positioned in each sector to send data to and receive data from access terminals 118 located in the sectors.

In practice, a base transceiver station 104a-104c will often include a main receiver plus one or more identical diversity receivers. The antennae of each receiver are spaced apart from each other by a distance of several (e.g., 10) wavelengths of the radio frequency (RF) carrier (e.g., 0.153 meters for 1900 MHz Personal Communications Service (PCS) band). This spatial diversity mitigates against RF fading and multi-path effects incurred by destructively combining RF waves due to multiple RF receive paths between the access terminal 118 and the base transceiver station 104a-104c caused by, for example, terrain and obstacle reflections. Generally, the more diversity receivers employed, the better the performance of the uplink signal reception.

A base transceiver station, such as BTS 104a shown in FIGS. 1-2, can generally support a certain amount of data traffic. The amount of data traffic supported by a base transceiver station 104a-104c in a given sector is referred to as the pole capacity. However, pole capacity is a theoretical maximum that is limited by radio frequency (RF) interference present in the sector, which may be caused by access terminals 118 transmitting in the sector, access terminals 118 from adjacent sectors, access terminals 118 from other networks, or other RF sources such as microwave ovens. In some radio access networks, the data traffic within a sector is limited using a connection-based loading approach that limits the number of concurrent transmitting access terminals 118.

Network designers can design radio access networks 100 to limit the data traffic in a sector to maintain usage of the sector at some percentage of pole capacity, for example, 50% or 75% of the pole capacity. This limitation corresponds to some rise of total power over the baseline thermal noise of a receiver for a sector (referred to as "rise-over-thermal" or simply ROT). The total power received by a base transceiver station 104a-104c servicing a sector may be represented by the following time-varying function:

Total Power$(t)=S(t)+I(t)+N(t)$ where, S(t) is the total useful, decodable signal power received over time at the base transceiver station 104a-104c from all access terminals 118 in the sector, I(t) is the total undecodable signal power received over time at the base transceiver station 104a-104c from interference sources (e.g., access terminals in adjacent sectors, access terminals from another radio network, microwave ovens, etc.), and N(t) is the baseline noise power of the base transceiver station's 104a-104c receiver. Noise power, or thermal noise, results from thermally induced random fluctuation in current in the receiver's load resistance. Thus, since ROT represents total power over thermal noise, ROT may be calculated as a dimensionless quantity using the following equation:

$ROT(t)=[S(t)+I(t)+N(t)]/N(t)$

To ensure that a sector does not become overloaded, a radio access network 100 can manage the rise in thermal noise (ROT) at the radio receiver for each sector using a Common Rate Control mechanism that utilizes a predetermined target ROT to control transmissions in the radio access network 100. Under this Common Rate Control mechanism, if the ROT reaches the target, indicating that the sector is becoming overloaded, the radio access network 100 commands the access terminals 118 in the sector to reduce or hold their current transmission data rates. On the other hand, if the ROT falls below the target, the network 100 commands the access terminals 118 to increase or hold their current transmission rates.

In some examples, a 1xEV-DO-compliant network 100 implements Common Rate Control of access terminals 118 in a sector by setting (or clearing) the reverse activity (RA) bit in the reverse activity channel on the forward link. For example, if the current ROT value is at or above its target, then the base transceiver station 104a-104c for the affected sector sets the RA bit. If the ROT value is below the target, the RA bit is cleared. When an access terminal 118 receives data on a MAC channel with the RA bit set, the access terminal 118 becomes aware that the sector is over-loaded and executes a "coin-flip" algorithm to determine whether to freeze or reduce its transmit rate. If the coin-flip has a first outcome, the access terminal 118 holds its transmit rate, if the coin-flip has a second outcome, the access terminal 118 decreases its rate from its current rate to the next lowest rate defined by the 1xEV-DO standard. By reducing the rate at which access terminals 118 transmit on the reverse link, access terminals 118 transmit at less power, which decreases the access terminals' 118 usage of the base transceiver's 104a-104c power reception capacity for that sector. Thus, the Common Rate Control mechanism maintains a constant balance between the transmission rates of the access terminals 118 in the sector and the power received by the base transceiver station 104a-104c.

In a radio access network 100, the ROT value for each sector interrelates to the ROT value for other sectors, including those in other cells. This is due to the nature of the signal power, S, and interference, I, components of ROT. Signal power, S, is the useful, decodable signal received by a base transceiver station 104a-104c from an access terminal 118 in the sector. Interference, I, or the undecodable signal received by a base transceiver station 104a-104c, may originate from many sources, one of which is the decodable signal, S, transmitted from an access terminal 118 in a neighboring sector. Thus, while a transmission in one sector represents a source of decodable signal power in that sector, it represents a source of interference power in neighboring sectors.

FIG. 2 illustrates this relationship. The total power received at $BTS_A$ 104a for $Sector_3$ equals $S_{A3}+I_{A3}+N_{A3}$ and the total power received at $BTS_B$ 104b for $Sector_1$ equals $S_{B1}+I_{B1}+N_{B1}$. An access terminal 118 in $Cell_A$-$Sector_3$ contributes to the ROT value for every sector served by the BTSs in the network 100. For example, a transmission from an access terminal 118 in $Cell_A$-$Sector_3$ increases $S_{A3}$ in $Cell_A$-$Sector_3$ and $I_{B1}$ in $Cell_B$-$Sector_1$. Since ROT is a measurement related to total power, corresponding increases in both $ROT_{A3}$ and $ROT_{B1}$ result. Due to the increase in ROT values, the Common Rate Control mechanism in each sector may adjust the transmission rates of some or all of the access terminals 118 in that sector to maintain the balance between the transmission rates of the access terminals 118 in the sector and the power received by the base transceiver station 104a-104c servicing the sector.

Just as an increase in signal power, S, in one sector results in an increase in interference power, I, in another sector, a decrease of signal power, S, in one sector results in a decrease of interference power, I, in another sector. When there is a decrease of interference power, I, received by a base transceiver station 104a-104c, that base transceiver station 104a-104c is able to handle more signal power, S, because of the balance maintained by the Common Rate Control mechanism. As a base transceiver station 104a-104c receiving less power than expected will inform access terminals 118 in the sector to increase their transmission rates, the access terminals 118 in that sector will exhibit increased performance when there is less signal usage in a neighboring sector.

FIG. 3 provides an example of this re-adjustment of resources. At some initial time, t=0, the power allocation in the sectors served by $BTS_A$ 104a and $BTS_B$ 104b may be approximately equal. However, at a later time, t=1, if the decodable signal power, S, received by $BTS_B$ 104b decreases, there is a corresponding decrease of interference power, I, received by $BTS_A$ 104a. The decrease in interference power, I, received by $BTS_A$ 104a results in increased signal power, S, resources for $BTS_A$ 104a. The Common Rate Control mechanism will allocate these resources to access terminals 118 in the appropriate sector. As a result, the decodable signal power received by $BTS_A$ 104a increases. Finally, this increase creates a corresponding increase of interference power, I, received by $BTS_B$ 104b.

This interrelationship of total power between sectors may be used to the advantage of service providers. While the Common Rate Control mechanism may naturally create varying performance rates depending upon usage in neighboring sectors, the radio access network 100 can also systematically create differentiated performance amongst sectors. Performance may be quantified by the throughput and delay associated with services offered by the cellular network to an access terminal 118.

A measure known in the CDMA 1x EV-DO and 1x EV-DV literature as load indicates how much of the total power received by a base transceiver station 104a-104c is decodable signal power, S. Each access terminal 118 in a sector contributes some portion of signal power, S, to the total load for the sector. Thus, the load of a group of access terminals 118 at a particular base transceiver station 104a-104c represents the ratio of total decodable signal power, S, received by that base transceiver station 104a-104c, for that group of access terminals 118, to the total power received at the same base transceiver station 104a-104c. Applying this concept to the relationship described above, a decrease in the load, or aggregate decodable signal power, of one sector will decrease the interference power, I, received by the base transceiver station 104a-104c in a neighboring sector. Following the decrease in interference power, I, the base transceiver station 104a-104c in the neighboring sector can notify a group of access terminals 118 to increase their transmission rates. The increase in transmission rates results in an increase in performance. Therefore, using load, the performance of one group of access terminals 118 can be differentiated from that of another group of access terminals 118. This concept can be applied to access terminals 118 in sectors in different cells as well as to access terminals 118 in sectors within the same cell.

Figure 4A:
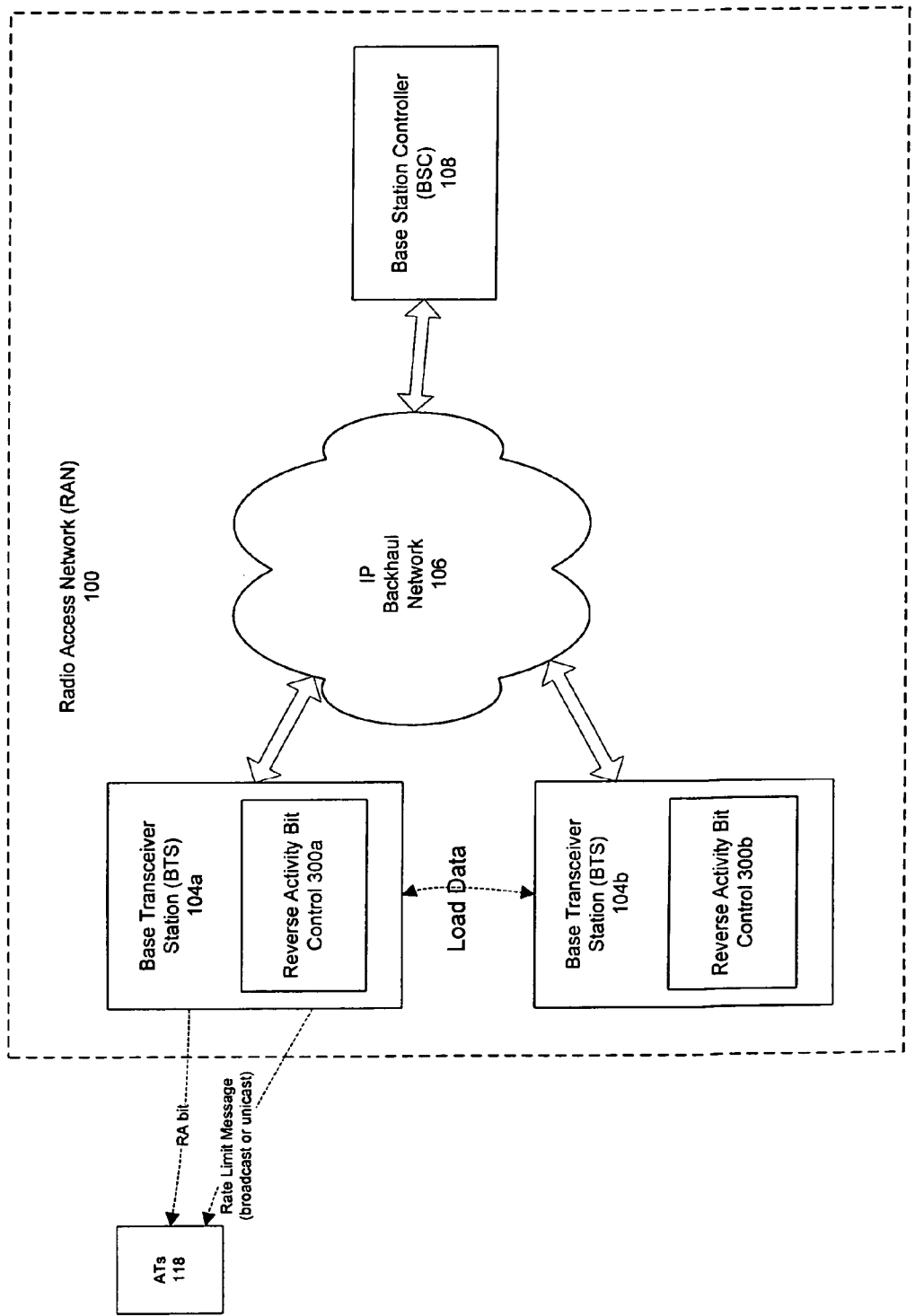
FIG. 4a is a diagram of a radio access network.
Figure 4B:
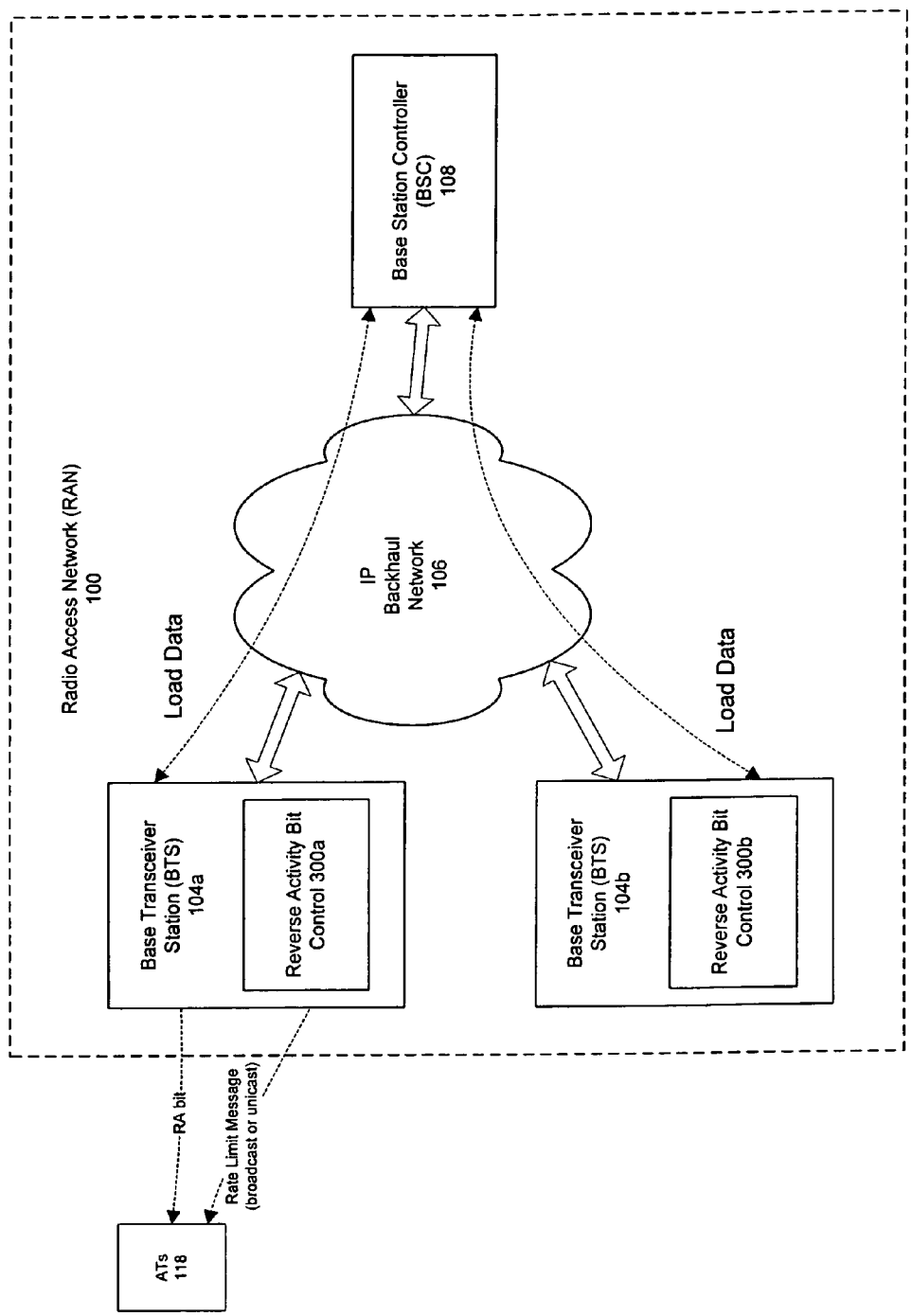
FIG. 4b is a diagram of a radio access network.

In some examples, differentiated throughput performance is achieved by using load information feedback from base transceiver stations 104a-104c. Access terminal 118 groups are defined by preferred service sectors. A particular group may, then, receive increased performance at the expense of allocable power resources for other groups of access terminals 118 as dictated by the radio access network 100. To achieve this, load and group status information is shared between multiple sectors in the system. One way to implement this is through decentralized BTS-to-BTS communications, as seen in FIG. 4a. Another implementation may use the centralized Base Station Controller (BSC) 108 shown in FIG. 4b. The information conveyed by the base transceiver stations 104a-104c in either example may contain the target and actual load data, the difference between those measurements, or even a quantized value of the difference.

In some examples, differentiated rate control is based on geography. In this implementation, the system improves throughput performance for access terminals 118 grouped by geographic area. First, the base transceiver station 104a-104c is configured with a target throughput performance for the group of access terminals 118 in a predefined geographic area. Since throughput performance is directly related to the transmission power of an access terminal 118, and load is a measure of decodable signal power received by the base transceiver station 104a-104c, then, in this example, load is treated as a measure of throughput performance. Therefore, the target throughput performance, or group-load target, is used by the system to prompt increased or decreased transmission rates. Thus, as access terminals 118 in the group attempt to increase their transmission power toward the group-load target, such that the Common Rate Control mechanism would normally decrease their transmission rates, the system would instead decrease transmission rates for non-group access terminals 118 to free power resources for the group.

In some examples, differentiated latency control is achieved by using load information feedback from base transceiver stations 104a-104c. CDMA architectures such as 1x EV-DO and 1x EV-DV may use interlaced Hybrid ARQ error detection and correction. Under this method, high transmission rates support early decoding and, hence, lower latency of transmitted data packets. High transmission rates relate directly to increased power received by base transceiver stations 104a-104c. Thus, differentiated latency control may be achieved using a load-based feedback mechanism. Multimedia applications require very low bit-error-rates and perform best in reliable communications conditions with low delays. In such cases, the network 100 provides preferred service to a group in order to deliver lower latency. Similar to the previous example, a group-load target is set and the system allocates resources so as to meet that target.

Although the techniques described above employ the 1xEV-DO air interface standard, the techniques are also applicable to other CDMA and non-CDMA interference limited multi-user communications systems in which a control system based on load information feedback is used to allocate limited radio resources within a network to achieve differentiated performance amongst competing groups of access terminals.

The techniques described above can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of implementations of the invention have been described. Nevertheless, it will be understood that various modifications may be made without departing from the spirit and scope of the invention, and, accordingly, other implementations are within the scope of the following claims.

What is claimed is:

1. A computer-implemented method comprising:
obtaining information indicative of a target load value for a group of access terminals in a sector of a radio access network, with the sector comprising other access terminals that differ from the access terminals in the group;
determining, using a computer, a load value for the group, with the load value being less than the target load value;
decreasing one or more transmission rates of one or more of the other access terminals to free power resources for an increase in transmission power for the group; and
increasing transmission power for the group from the load value to another value that is (i) greater than the load value, and (ii) less than or equal to the target load value;
wherein the load value is defined as a ratio of total signal power received by a base transceiver station in the radio access network, from the access terminals in the group, to a total power received by the base transceiver station; and
wherein the total power comprises a sum of (i) the total signal power for the group, (ii) a total interference power received by the base transceiver station, and (iii) a baseline noise power of a receiver of the base transceiver station.

2. The method of claim 1, further comprising:
controlling a level of transmission power used by the group of access terminals to enable differentiated throughput performance amongst the group of access terminals and the other access terminals in the sector.

3. The method of claim 2, wherein the differentiated throughput performance comprises one or more temporal factors.

4. The method of claim 3, wherein the differentiated throughput performance comprises one or more of an uplink data rate and an uplink latency value.

5. The method of claim 1, wherein decreasing is performed at the base transceiver station.

6. The method of claim 1, wherein decreasing is performed at a base station controller in the radio access network.

7. The method of claim 1, wherein the radio access network comprises a code division multiple access network.

8. The method of claim 1, wherein the radio access network comprises one or more of a first evolution-data optimized network and a first evolution-data/voice compliant network.

9. The method of claim 1, wherein the group of access terminals comprise one or more access terminals configured to communicate with the radio access network.

10. The method of claim 1, wherein the decreasing is further based on information indicative of relative levels of transmission power used by the group of access terminals.

11. The method of claim 10, wherein the base transceiver station comprises a first base transceiver station, and wherein the method further comprises:
sending the information to a second base transceiver station in the radio access network.

12. The method of claim 10, wherein the base transceiver station is configured to send the information to a base station controller.

13. The method of claim 1, wherein the group of access terminals comprises a first group of access terminals, and wherein the total interference power comprises signal power from one or more second groups of access terminals.

14. The method of claim 13, wherein the sector comprises the one or more second groups of access terminals.

15. The method of claim 1, wherein the group of access terminals comprises a first group of access terminals, and wherein the method further comprises:

causing one or more second groups of access terminals to decrease transmission power to reduce the total interference power; and causing the first group of access terminals to increase transmission power in response to a reduction of the total interference power.

16. The method of claim 1, further comprising:

causing a reduction in the total interference power, in response to the increased value of transmission power from the group of access terminals, and a decrease in the transmission rates one or more of the other access terminals in the sector.

17. The method of claim 1, further comprising:

comparing the load value to the target load associated with the group of access terminals.

18. The method of claim 17, further comprising:

using a predetermined target rise-over-thermal (ROT) value to control transmissions in the radio access network.

19. The method of claim 1, further comprising:

setting a transmission rate limit for an access terminal in the group of access terminals.

20. The method of claim 19, wherein setting the transmission rate limit comprises:

transmitting, to the access terminal, the transmission rate limit.

21. The method of claim 20, wherein transmitting the transmission rate limit comprises:

broadcasting a rate limit message to the access terminal.

22. The method of claim 20, wherein transmitting the transmission rate limit comprises:

unicasting a rate limit message to the access terminal.

23. A non-transitory computer readable storage medium configured to store instructions that are executable by one or more processing devices to perform operations comprising:

obtaining information indicative of a target load value for a group of access terminals in a sector of a radio access network, with the sector comprising other access terminals that differ from the access terminals in the group;

determining a load value for the group, with the load value being less than the target load value;

decreasing one or more transmission rates of one or more of the other access terminals to free power resources for an increase in transmission power for the group; and increasing transmission power for the group from the load value to another value that is (i) greater than the load value, and (ii) less than or equal to the target load value;

wherein the load value is defined as a ratio of total signal power received by a base transceiver station in the radio access network, from the access terminals in the group, to a total power received by the base transceiver station; and wherein the total power comprises a sum of (i) the total signal power for the group, (ii) a total interference power received by the base transceiver station, and (iii) a baseline noise power of a receiver of the base transceiver station.

24. The non-transitory computer readable storage medium of claim 23, wherein the operations further comprise:

controlling a level of transmission power used by the group of access terminals to enable differentiated throughput performance amongst the group of access terminals and the other access terminals in the sector.

25. The non-transitory computer readable storage medium of claim 24, wherein the differentiated throughput performance comprises one or more temporal factors.

26. The non-transitory computer readable storage medium of claim 25, wherein the differentiated throughput performance comprises one or more of an uplink data rate and an uplink latency value.

27. The non-transitory computer readable storage medium of claim 23, wherein decreasing is further based on information indicative of relative levels of transmission power used by the group of access terminals.

28. The non-transitory computer readable storage medium of claim 27, wherein the base transceiver station comprises a first base transceiver station, and wherein the operations further comprise:

exchanging the information between the first base transceiver station and a second base transceiver station in the radio access network.

29. The non-transitory computer readable storage medium of claim 27, wherein the base transceiver station is configured to send the information to a base station controller.

30. The non-transitory computer readable storage medium of claim 23, wherein the group of access terminals comprises a first group of access terminals, and wherein the total interference power comprises signal power from one or more second groups of access terminals.

31. The non-transitory computer readable storage medium of claim 30, wherein the sector comprises the one or more second groups of access terminals.

32. The non-transitory computer readable storage medium of claim 23, wherein the base transceiver station comprises one of the one or more processing devices.

33. The non-transitory computer readable storage medium of claim 32, wherein a base station controller in the radio access network comprises one of the one or more processing devices.

34. The non-transitory computer readable storage medium of claim 23, wherein the operations further comprise:

comparing the load value to the target load value.

35. The non-transitory computer readable storage medium of claim 34, wherein the operations further comprise:

using a predetermined target rise-over-thermal (ROT) to control transmissions in the radio access network.

36. The non-transitory computer readable storage medium of claim 23, wherein the operations further comprise:

setting a transmission rate limit for an access terminal in the group of access terminals.

37. The non-transitory computer readable storage medium of claim 36, wherein the operations further comprise:

transmitting to the access terminal the transmission rate limit.

38. The non-transitory computer readable storage medium of claim 37, wherein the operations further comprise:

broadcasting a rate limit message to the access terminal.

39. The non-transitory computer readable storage medium of claim 37, wherein the operations further comprise:

unicasting a rate limit message to the access terminal.

40. The non-transitory computer readable storage medium of claim 23, wherein the group of access terminals comprises a first group of access terminals, and wherein the operations further comprise:

causing one or more second groups of access terminals to decrease transmission power to reduce the total interference power; and causing the first group of access terminals to increase transmission power in response to a reduction of the total interference power.

41. The non-transitory computer readable storage medium of claim 23, wherein the operations further comprise:

causing a reduction in the total interference power, in response to the increased value of transmission power from the group of access terminals, and a decrease in the transmission rates one or more of the other access terminals in the sector.

42. A system comprising:

one or more processing devices; and a non-transitory medium configured to store instructions to cause the one or more processing devices to perform operations comprising:

obtaining information indicative of a target load value for a group of access terminals in a sector of a radio access network, with the sector comprising other access terminals that differ from the access terminals in the group;

determining a load value for the group, with the load value being less than the target load value;

decreasing one or more transmission rates of one or more of the other access terminals to free power resources for an increase in transmission power for the group; and increasing transmission power for the group from the load value to another value that is (i) greater than the load value, and (ii) less than or equal to the target load value;

wherein the load value is defined as a ratio of total signal power received by a base transceiver station in the radio access network, from the access terminals in the group, to a total power received by the base transceiver station; and wherein the total power comprises a sum of (i) the total signal power for the group, (ii) a total interference power received by the base transceiver station, and (iii) a baseline noise power of a receiver of the base transceiver station.

* * * * *